United States Patent

Machida et al.

[11] Patent Number: 6,141,138
[45] Date of Patent: Oct. 31, 2000

[54] APPARATUS AND METHOD FOR MEASURING CHARACTERISTICS OF LIGHT

[75] Inventors: Susumu Machida; Shudong Jiang; Jun Chen, all of Tokyo, Japan; Yoshihisa Yamamoto, Stanford, Calif.

[73] Assignee: Japan Science and Technology Corporation, Japan

[21] Appl. No.: 09/160,910

[22] Filed: Sep. 25, 1998

[30] Foreign Application Priority Data

Sep. 26, 1997 [JP] Japan .................................... 9-262064
Jan. 20, 1998 [JP] Japan .................................... 10-008919

[51] Int. Cl.[7] ...................................................... G02F 1/01
[52] U.S. Cl. ............................................................ 359/279
[58] Field of Search ................................... 359/278, 277, 359/279, 618; 356/357, 349

[56] References Cited

U.S. PATENT DOCUMENTS

| | | | |
|---|---|---|---|
| 4,836,676 | 6/1989 | Kim et al. ................................ | 356/350 |
| 5,253,038 | 10/1993 | Bouwhuis et al. ...................... | 356/351 |
| 5,623,339 | 4/1997 | Wickramasinghe et al. ........... | 356/357 |

*Primary Examiner*—Ricky Mack
*Attorney, Agent, or Firm*—Flehr, Hohbach, Test, Albritton & Herbert LLP

[57] ABSTRACT

An optical phase characteristic measuring apparatus includes a harmonic generator for generating a harmonic wave from a fundamental wave of output light from a light source; a beam splitter for splitting a fundamental-wave component of the output light and a harmonic component; a sample disposed in one of optical paths along which light beams from the beam splitter propagate; a unit that is composed of a signal generator and a mirror and is adapted to modulate the length of one of the optical paths; an optical mixer for mixing the light beams containing the fundamental-wave component and the harmonic component; an optical separator for separating light output from the optical mixer into a fundamental-wave component and a harmonic component; a first optical detector for detecting a fundamental-wave component of an output from the optical separator; a second optical detector for detecting a harmonic component of the output from the optical separator; and a phase detector for detecting the phase difference between AC signals output from the two optical detectors. An optical amplitude/phase characteristic measuring apparatus has a similar structure but includes two light sources, a sum-frequency generator, and other related circuits.

12 Claims, 6 Drawing Sheets

APPARATUS AND METHOD FOR MEASURING CHARACTERISTICS OF LIGHT

BACKGROUND OF THE INVENTION

1. Field of the Invention

The present invention relates to an apparatus and method for measuring characteristics of light, and more particularly to an apparatus and method for measuring the phase of an optical signal or for concurrently measuring the amplitude and phase of an optical signal.

2. Description of the Related Art

Conventionally, in order to measure the phase of an optical signal, there has been used a homodyne phase detection method and a method in which phase detection is performed after heterodyne detection. However, since both methods utilize an interferometer, the interferometer must be stabilized.

Since such an interferometer is generally stabilized by control the phase variation (variation in optical path difference), it is difficult to separate a change in the phase of a signal to be measured from a phase variation of the interferometer.

Also, there has been employed a method in which two light sources emitting two optical signals of different wavelengths are used in order to detect variations of the interferometer. However, this method makes the structure of a measurement apparatus complex. In addition, it is difficult to cause optical paths within the interferometer to coincide with each other completely, and complicated processing is needed to extract a target phase signal from two detected phase signals.

Since the above-described conventional techniques require stabilization of the interferometer or disposition of two light sources emitting two optical signals of different wavelengths, the conventional techniques still have room for improvement.

Meanwhile, in order to evaluate a surface or interface of a nonlinear optical crystal or substance, there has been measured a second harmonic that is generated upon radiation of a fundamental wave onto the surface or interface, or an optical signal that is generated upon radiation of two fundamental waves onto the surface or interface and has a frequency equal to the sun or difference of the frequencies of the two fundamental waves. Since optical signals to be measured are considerably weak as compared with the fundamental wave or waves, design of a separation circuit for separating the optical signals from the fundamental-wave component or components is difficult. If components other than an optical signal to be measured leak from the separation circuit, the leaked components become background light. Achieving complete separation involves a large amount of loss, and deteriorates measurement sensitivity. As mentioned above, homodyne detection and heterodyne detection have been used in order to measure the amplitude and phase of an optical signal with high sensitivity. Since both the homodyne detection and heterodyne detection utilize the effect of interference between signal light and local oscillator light, effects of background light can be eliminated. However, these methods utilize an interferometer, and the interferometer must be stabilized. Since such an interferometer is generally stabilized by control the phase variation, measuring the amplitude and phase of an optical signal with high sensitivity is impossible, unless the phase variation of the interferometer is separated from the phase variation of the optical signal to be measured.

Since the above-described conventional method requires stabilization of an interferometer in order to achieve highly sensitive measurement of the amplitude and phase of an optical signal through homodyne detection or heterodyne detection, there is still room for improvement.

SUMMARY OF THE INVENTION

The present invention was accomplished in view of the foregoing problems involved in prior art techniques, and an object of the present invention is to provide an apparatus and method for measuring the phase of an optical signal with high sensitivity and improved stability through use of one light source and without stabilization of an interferometer.

Another object of the present invention is to provide an apparatus and method for concurrently measuring the amplitude and phase of an optical signal with high sensitivity and improved stability without stabilization of an interferometer.

To achieve the above objects, the present invention provides the following apparatuses and methods for measuring optical phase characteristics:

(1) An optical phase characteristic measuring apparatus which comprises: means for generating a harmonic wave from a fundamental wave of output light from a light source; a beam splitter for splitting the fundamental-wave Component and the harmonic-wave component of the output light; a sample disposed in one of optical paths along which light beams from the beam splitter propagate; means for modulating the length of one of the optical paths; an optical mixer for mixing the light beams containing the fundamental-wave component and the harmonic component; an optical separator for separating light output from the optical mixer into a fundamental-wave component and a harmonic component; a first optical detector for detecting a fundamental-wave component of the output from the optical separator; a second optical detector for detecting a harmonic component of the output from the optical separator; and means for detecting a phase difference between AC signals output from the two optical detectors.

(2) An optical phase characteristic measuring method wherein there are provided means for generating a harmonic from a fundamental wave of output light from a light source and a beam splitter for splitting the fundamental-wave component of the output light and the harmonic component; a sample is disposed in one of optical paths along which light beams from the beam splitter propagate; and there are further provided means for modulating the length of one of the optical paths, an optical mixer for mixing the light beams containing the fundamental-wave component and the harmonic component, an optical separator for separating light output from the optical mixer into a fundamental-wave component and a harmonic component, a first optical detector for detecting the fundamental-wave component of an output from the optical separator, a second optical detector for detecting the harmonic component of the output from the optical separator, and means for detecting a phase difference between AC signals output from the two optical detectors, wherein a harmonic a component is generated from the fundamental-wave component of output light from the light source; after splitting by the beam splitter, the length of one of the optical paths is modulated; the fundamental-wave component and the harmonic component are separately subjected to homodyne detection; and a phase difference between AC signals generated by the modulation of optical path difference is measured.

(3) An optical phase characteristic measuring apparatus which comprises: a beam splitter for splitting a fundamental-wave component of output light from a light source; a sample disposed in one of optical paths along which light beams from the beam splitter propagate; means disposed in the other optical path and adapted to generate a harmonic; means for modulating the length of one of the optical paths; an optical mixer for mixing the light beams containing the fundamental-wave component and the harmonic component; an optical separator for separating light output from the optical mixer into a fundamental-wave component and a harmonic component; a first optical detector for detecting a fundamental-wave component of an output from the optical separator; a second optical detector for detecting a harmonic component of the output from the optical separator; and means for detecting a phase difference between AC signals output from the two optical detectors.

(4) An optical phase characteristic measuring method wherein there is provided a beam splitter for splitting a fundamental-wave component of output light from a light source; a sample is disposed in one of optical paths along which light beams from the beam splitter propagate; and there are further provided means disposed in the other optical path and adapted to generate a harmonic, means for modulating the length of one of the optical paths, an optical mixer for mixing the light beams containing the fundamental-wave component and the harmonic component, an optical separator for separating light output from the optical mixer into a fundamental-wave component and a harmonic component, a first optical detector for detecting the fundamental-wave component of an output from the optical separator, a second optical detector for detecting the harmonic component of the output from the optical separator, and means for detecting a phase difference between AC signals output from the two optical detectors, wherein after the fundamental-wave component of the output light from the light source is split, the harmonic component is generated by the sample disposed in one of the other optical path; the length of one of the optical paths is modulated; the fundamental-wave component and the harmonic component are separately subject to homodyne detection, thereby measuring a phase difference between AC signal components generated by the modulation of the optical path difference.

(5) The optical phase characteristic measuring apparatus described in (1) or (3) above further comprises means for multiplying by N the frequency of the AC signal output from the first optical detector for detecting the fundamental-wave component (where N is the order of a harmonic generated by the harmonic generation means); and means for measuring a phase difference between an output of the second optical detector for detecting the harmonic component and a signal having a frequency that is N times the frequency of the AC signal.

(6) In the optical phase characteristic measuring method described in (2) or (4) above, the frequency of the AC signal output from the first optical detector for detecting the fundamental-wave component is multiplied by N (where N is the order of a harmonic generated by the harmonic generation means); and a phase difference between an output of the second optical detector for detecting the harmonic component and a signal having a frequency that is N times the frequency of the AC signal is measured.

(7) The optical phase characteristic measuring apparatus described in (1), (3), or (5) above further comprises a third optical detector for detecting the output of the optical mixer; an electrical signal separator for separating a signal output from the third optical detector; and means for measuring a phase difference between output signals of the separator.

(8) In the optical phase characteristic measuring method described in (2), (4), or (6), the output of the optical mixer is detected by use of a third optical detector; a signal output from the third optical detector is separated through use of an electrical signal separator; and a phase difference between output signals of the separator is measured.

(9) The optical phase characteristic measuring apparatus described in (1), (3), (5) or (7) above further comprises a resonator for passing an AC component of the output signal of the detector; and means for converting the waveform of an AC component output from the resonator into a triangular waveform.

(10) In the optical phase characteristic measuring method described in (2), (4), (6) or (8), there are disposed a resonator for passing an AC component of the output signal of the detector; and means for converting the waveform of an AC component output from the resonator into a triangular waveform, wherein an AC signal generated through modulation of the optical path difference is fed back to the means for modulating the optical path difference to bring it into a self oscillation state to thereby generate an AC signal.

(11) The optical phase characteristic measuring apparatus described in (9) above further comprises a resonator for passing an AC component of the output signal of the detector; and means for causing oscillation at a frequency substantially equal to the frequency of the AC component output from the resonator.

(12) In the optical phase characteristic measuring method described in (10) above, there are provided a resonator for passing an AC component of the output signal of the detector; and means for causing oscillation at a frequency substantially equal to the frequency of the AC component output from the resonator, wherein an AC signal generated by the modulation of the optical path difference is injected into the oscillation means that oscillates in a self-oscillation state, in order to establish synchronization, thereby generating the AC signal.

By virtue of the above-described structure, it is rossible to measure a phase difference between two AC signals derived from the fundamental-wave component and the harmonic component, which are generated through modulation of the optical path difference of a homodyne interferometer, without stabilizing the homodyne interferometer.

Instability of a homodyne interferometer is mainly caused by phase change due to variation in optical path difference of the interferometer. In general, such phase change is detected in order to stabilize the interferometer by means of negative feedback control. In such a case, it is difficult to separate from each other a negative feedback signal and a phase signal to be measured.

When one of the optical path lengths is modulated in a state in which the interferometer is not stabilized, interference fringes change in accordance with the modulation speed and the amplitude, so that an AC signal is generated.

The amplitude of this AC signal coincides with the visibility of the interferometer and therefore is stable (see Japanese Patent Application Laid-Open No. 10-30965).

However, since the instability caused by the un-stabilized interferometer is converted into the phase of the AC signal, phase characteristics cannot be measured stably.

In order to solve such a problem, there is employed a method for detecting phase variation through use of the fundamental wave of the light source and the harmonic thereof. When an N-th harmonic (frequency: N times, wavelength: 1/N), which is generated from a fundamental wave, i.e., output light from a light source, is used, a strong correlation exists between the phases of the above-described AC signals, because the phase relationship is maintained between the fundamental wave and the N-th harmonic.

It is assumed that the harmonic generator generates a secondary harmonic wave the modulation of optical path difference is performed through use of a triangular wave whose frequency is set to 100 Hz and modulation path difference is set to 10 times the wavelength of the fundamental wave. When the fundamental-wave component and the secondary harmonic component are split by means of a beam splitter, and are separately subjected to homodyne detection, the frequency of an AC signal generated from the fundamental-wave component has a frequency of 2 kHz, while an AC signal generated from the secondary harmonic component has a frequency of 4 kHz, because the wavelength of the AC signal generated from the secondary harmonic component becomes ½. Further, phase correlation is preserved between the respective AC signals.

Accordingly, the optical phase characteristics of a sample can be measured through measurement of variation of the phase difference between the two AC signals.

Therefore, if a sufficient amount of light is used as local oscillator light transmitting through one of the optical paths, a very weak signal light transmitting through the other optical path can be measured, so that measurement of amplitude characteristics can be measured concurrently with highly sensitive measurement of phase characteristics.

Further, since the optical detectors used in the present embodiment is only required to have a bandwidth necessary to detect an AC signal generated upon modulation of the optical path difference, the optical detectors do not have to have a wide band characteristics.

The present invention also provides the following apparatuses and methods for measuring optical amplitude and phase characteristics:

(13) An optical amplitude/phase characteristics measuring apparatus which comprises: two light sources for emitting light beams having different wavelengths; a beam splitter for splitting fundamental-wave components of the light beams from the two light sources; a sample disposed in one of optical paths along which light beams from the beam splitter propagate; means disposed in the other optical path and adapted to generate a sum-frequency component whose frequency is the sum of the frequencies of the fundamental waves from the two light sources; means for modulating the length of one of the optical paths; an optical mixer for mixing the light beams containing the two fundamental-wave components and the two sum-frequency components; an optical separator for separating light output from the optical mixer into fundamental-wave components and a sum-frequency component; two optical detector means for detecting two fundamental-wave components of an output from the optical separator; means for generating a sum-frequency component whose frequency is the sum of the frequencies of the two fundamental-wave components of the output from the optical detector means; means for detecting a sum-frequency component of the output from the optical separator; and means for detecting an amplitude and phase difference of the output AC signals derived from the sum-frequency component.

(14) An optical amplitude/phase characteristics measuring method wherein there are provided two light sources for emitting light beams having different wavelengths; a beam splitter for splitting fundamental-wave components of the light beams from the two light sources; a sample disposed in one of optical paths along which light beams from the beam splitter propagate; means disposed in the other optical path and adapted to generate a sum-frequency component whose frequency is the sum of the frequencies of the fundamental waves from the two light sources; means for modulating the length of one of the optical paths; an optical mixer for mixing the light beams containing the two fundamental-wave components and the two sum-frequency components; an optical separator for separating light output from the optical mixer into fundamental-wave components and a tow sum-frequency component; two optical detector means for detecting the two fundamental-wave components of an output from the optical separator; means for generating a sum-frequency component whose frequency is the sum of the frequencies of the two fundamental-wave components of the output from the optical detector means; means for detecting a sum-frequency component of the output from the optical separator; and means for detecting an amplitude and phase difference of the output AC signals derived from the sum-frequency component, wherein after the fundamental-wave components of the light beams from the two light sources are split by means of the beam splitter, the length of one optical path is modulated; the two fundamental-wave components and the sum-frequency component are separately subjected to homodyne detection; and an amplitude and phase difference of the sum-frequency component of light generated by the sample are measured, while there is used, as a reference signal, an AC signal whose frequency is the sum of the frequencies of AC signals derived from the two fundamental-wave components generated through modulation of the optical path difference.

(15) An optical amplitude/phase characteristics measuring apparatus which comprises: two light sources for emitting light beams having different wavelengths; a beam splitter for splitting fundamental-wave components of the light beams of the two light sources; a sample disposed in one of optical paths along which light beams from the beam splitter propagate; means disposed in the other optical path and adapted to generate a difference-frequency component whose frequency is the difference of the frequencies of the fundamental waves from the two light sources; means for modulating the length of one of the optical paths; an optical mixer for mixing the light beams containing the two fundamental-wave components and the two difference-frequency components; an optical separator for separating light output from the optical mixer into fundamental-wave components and a difference-frequency component; two optical detector means for detecting the two fundamental-wave components of an output from the optical separator; means for generating a difference-frequency component whose frequency is the difference of the frequencies of the two fundamental-wave components of the output from the optical detector means; means for detecting a difference-frequency component of the output from the optical separator; and means for detecting an amplitude and phase difference of the output AC signals derived from the difference-frequency component.

(16) An optical amplitude/phase characteristics measuring method wherein there are disposed two light sources for emitting light beams having different wavelengths; a beam splitter for splitting fundamental-wave components of the light beams from the two light sources; a sample disposed in one of optical paths along which light beams from the beam splitter propagate; means disposed in the other optical path and adapted to generate a difference-frequency component whose frequency is the difference of the frequencies of the fundamental waves from the two light sources; means for modulating the length of one of the optical paths; an optical mixer for mixing the light beams containing the two fundamental-wave components and the two difference-frequency components; an optical separator for separating light output from the optical mixer into fundamental-wave components and a difference-frequency component; two optical detector means for detecting two fundamental-wave components of an output from the optical separator; means for generating a difference-frequency component whose frequency is the difference of the frequencies of the two fundamental-wave components of the output from the optical detector means; means for detecting a difference-frequency component of the output from the optical separator; and means for detecting an amplitude and phase difference of the output AC signals derived from the difference-frequency component, wherein after the fundamental-wave components of the light beams from the two light sources are split by means of the beam splitter, the length of one optical path is modulated; the two fundamental-wave components and the difference-frequency component are separately subjected to homodyne detection; and an amplitude and phase difference of the difference-frequency component of light generated by the sample are measured, while there is used, as a reference signal, an AC signal whose frequency is the difference of the frequencies of AC signals derived from the two fundamental-wave components generated through modulation of the optical path difference.

(17) An optical amplitude/phase characteristics measuring apparatus which comprises: two light sources for emitting light beams having different wavelengths; an optical mixer for mixing fundamental-wave components of the light beams from the two light sources; a sample disposed in an optical path along which an output from the optical mixer propagates, said sample generating a sum-frequency component; a beam splitter for simultaneously splitting the two fundamental-wave components and the sum-frequency component; means for modulating the length of one of optical paths along which light beams from the beam splitter propagate; an optical mixer for mixing the light beams containing the two fundamental-wave components and the two sum-frequency components; an optical separator for separating light output from the optical mixer into fundamental-wave components and a sum-frequency component; two optical detector means for detecting two fundamental-wave components of an output from the optical separator; means for generating a sum-frequency component whose frequency is the sum of the frequencies of the two fundamental-wave components of the output from the optical detector means; means for detecting a sum-frequency component of the output from the optical separator; and means for detecting an amplitude and phase difference of the output AC signal derived from the sum-frequency component.

(18) An optical amplitude/phase characteristics measuring method wherein there are provided two light sources for emitting light beams having different wavelengths; an optical mixer for mixing fundamental-wave components of the light beams from the two light sources; a sample disposed in an optical path along which an output from the optical mixer propagates, said sample generating a sum-frequency component; a beam splitter for simultaneously splitting the two fundamental-wave components and the sum-frequency component; means for modulating the length of one of optical paths along which light beams from the beam splitter propagate; an optical mixer for mixing the light beams containing the two fundamental-wave components and the two sum-frequency components; an optical separator for separating light output from the optical mixer into fundamental-wave components and a sum-frequency component; two optical detector means for detecting the two fundamental-wave components of an output from the optical separator; means for generating a sum-frequency component whose frequency is the sum of the frequencies of the two fundamental-wave components of the output from the optical detector means; means for detecting a sum-frequency component of the output from the optical separator; and means for detecting an amplitude and phase difference of the output AC signals derived from the sum-frequency component, wherein after the fundamental-wave components of the output light from the two light sources are mixed by means of the optical mixer, the fundamental-wave components of the output light and the sum-frequency component generated by the sample are split, the length of one optical path is modulated; the two fundamental-wave components and the sum-frequency component separately subjected to homodyne detection; and an amplitude and phase difference of the sum-frequency component of light generated by the sample are measured, while there is used, as a reference signal, an AC signal whose frequency is the sum of the frequencies of AC signals derived from the two fundamental-wave components generated through modulation of the optical path difference.

(19) An optical amplitude/phase characteristics measuring apparatus which comprises: two light sources for emitting light beams having different wavelengths; an optical mixer for mixing fundamental-wave components of the light beams from the two light sources; a sample disposed in an optical path along which an output from the optical mixer propagates, said sample generating a difference-frequency component; a beam splitter for simultaneously splitting the two fundamental-wave components and the difference-frequency component; means for modulating the length of one of optical paths along which light beams from the beam splitter propagate; an optical mixer for mixing the light beams containing the two fundamental-wave components and the two difference-frequency components; an optical separator for separating light output from the optical mixer into fundamental-wave components and a difference-frequency component; two optical detector means for detecting two fundamental-wave components of an output from the optical separator; means for generating a difference-frequency component whose frequency is the difference of the frequencies of the two fundamental-wave components of the output from the optical detector means; means for detecting a difference-frequency component of the output from the optical separator; and means for detecting an amplitude and phase difference of the output AC signals derived from the difference-frequency component.

(20) An optical amplitude/phase characteristics measuring method wherein there are provided two light sources for emitting light beams having different wavelengths; an optical mixer for mixing fundamental-wave components of the light beams from the two light sources; a sample disposed in an optical path along which an output from the optical mixer propagates, said sample generating a difference-frequency component; a beam splitter for simultaneously splitting the two fundamental-wave components and the difference-frequency component; means for modulating the length of one of optical paths along which light beams from the beam splitter propagate; an optical mixer for mixing the light beams containing the two fundamental-wave components and the two difference-frequency components; an optical separator for separating light output from the optical mixer into fundamental-wave components and a difference-frequency component; two optical detector means for detecting two fundamental-wave components of an output from the optical separator; means for generating a difference-frequency component whose frequency is the difference of the frequencies of the two fundamental-wave components of the output from the optical detector means; means for detecting a difference-frequency component of the output from the optical separator; and means for detecting an amplitude and phase difference of the output AC signals derived from the difference-frequency component, wherein after the fundamental-wave components of the output light from the two light sources are mixed by means of the optical mixer, the fundamental-wave components of the output light and the difference-frequency component generated by the sample are split, the length of one optical path is modulated; the two fundamental-wave components and the difference-frequency component separately subjected to homodyne detection; and an amplitude and phase difference of the difference-frequency component of light generated by the sample are measured, while there is used, as a reference signal, an AC signal whose frequency is the difference of the frequencies of AC signals derived from the two fundamental-wave components generated through modulation of the optical path difference.

DESCRIPTION OF THE PREFERRED EMBODIMENTS

Embodiments of the present invention will now be described in detail with reference to the drawings.

Figure 1:
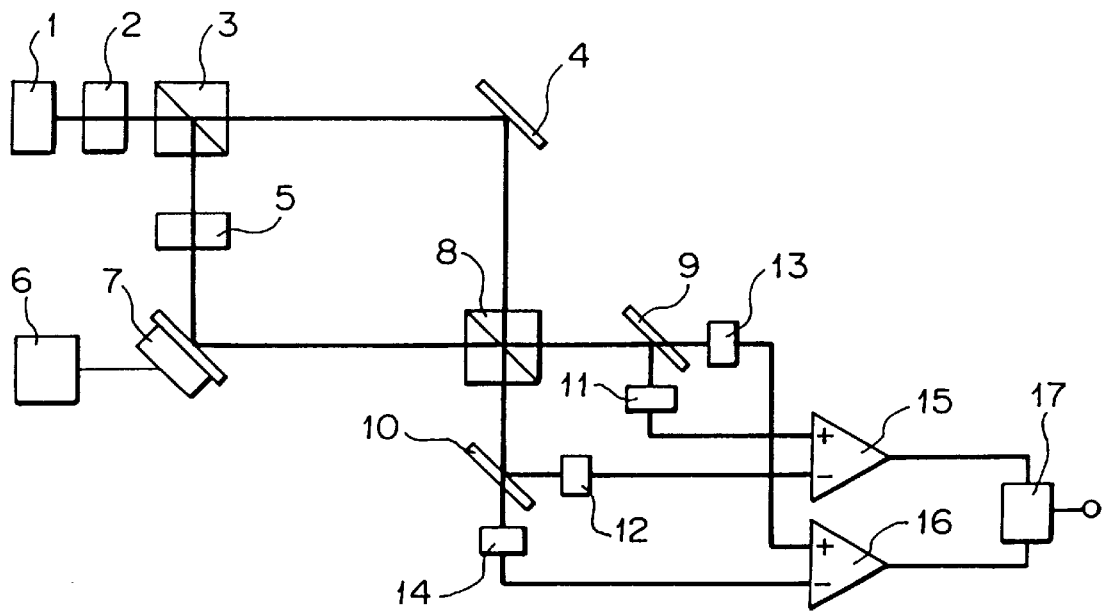
FIG. 1 is a diagram showing the overall structure of an optical phase characteristic measuring apparatus according to a first embodiment of the present invention.

First Embodiment:

FIG. 1 is a diagram showing the overall structure of an optical phase characteristic measuring apparatus according to a first embodiment of the present invention.

As shown in FIG. 1, the optical phase characteristic measuring apparatus according to the first embodiment comprises a light source 1, a harmonic generator 2, a beam splitter 3, a mirror 4, a sample 5 to be measured, a signal generator 6 for generating a signal for path difference modulation, a mirror 7 for path difference modulation, an optical mixer 8, optical separators 9 and 10, optical detectors 11, 12, 13, and 14 (11 and 12: first optical detectors, 13 and 14: second optical detectors), differential amplifiers 15 and 16, and a phase detector 17.

The harmonic generator 2 serves as a means for generating a harmonic from a fundamental wave; the signal generator 6 and the mirror 7 serve as a means for modulating a path difference; the optical detectors 11 and 12 and the differential amplifier 15 serve as a means for detecting a fundamental-wave component; and the optical detectors 13 and 14 and the differential amplifier 16 serve as a means for detecting a harmonic component.

The beam splitter 3 simultaneously splits the fundamental-wave component and the harmonic component, and the optical mixer 8 simultaneously mixes the fundamental-wave component and the harmonic component. A half mirror, a non-polarizing beam splitter, a polarizing beam splitter, an optical directional coupler, etc. may be used as the beam splitter 3 and the optical mixer 8.

The mirror 7 for path difference modulation is only required to produce a vibration having an amplitude about a few times the light wavelength, and may be an optical mirror bonded to a piezoelectric element. Since the function of the piezoelectric element is to continuously change the phase of light, any mechanism may be used insofar as the mechanism can cause a phase variation to the same extent as in the case where a piezoelectric element is used.

The optical separators 9 and 10 separate the harmonic component from the fundamental-wave component. A spectral prism, a dichroic mirror, or the like may be used as the optical separators 9 and 10.

The output from each of the optical separators 9 and 10 may be detected through use of a single optical detector. However, in the present embodiment, there is employed balanced detection in which the optical detectors 11 and 12 are combined with the differential amplifier 15, while the optical detectors 13 and 14 are combined with the differential amplifier 16. It is apparent that employment of balanced detection suppresses amplitude noise contained in the light output from the light source 1, so that the level of noise within the measurement system is decreased to the level of shot noise, resulting in an improved S/N ratio and increased sensitivity.

It is assumed that the harmonic generator 2 generates a second harmonic (hereinafter referred to as an "SHG wave") from the light output from the light source 1. The efficiency in generating harmonics is generally low; the output of the harmonic generator 2 includes the fundamental-wave component and the SHG-wave component. The light beam including these components is split into two beams at the beam splitter 3. One of the split beams is reflected by means of the mirror 4 and is led to the optical mixer 8 in order to serve as a local oscillator light for homodyne detection. The other split beam from the beam splitter 3 impinges on the sample 5 as signal light. The light from the sample 5 is reflected by the mirror 7 for path difference modulation, which is operated by means of the signal generator 6 for path difference modulation, and is then led to the optical mixer 8.

One of two interference signals output from the optical mixer 8 is led to the optical separator 9 to be separated into the fundamental-wave component and the SHG-wave component, and the other interference signal is led to the optical separator 10 to be separated into the fundamental-wave component and the SHG-wave component. The fundamental-wave components separated by means of the optical separators 9 and 10 are detected by means of the optical detectors 11 and 12, and two detection signals are input to the differential amplifier 15, so that an AC signal component generated due to path difference modulation is amplified. The amplified AC signal component is then led to the phase detector 17. The SHG-wave components separated by means of the optical separators 9 and 10 are detected by means of the optical detectors 13 and 14, and two detection signals are input to the differential amplifier 16, so that an AC signal component generated due to path difference modulation is amplified. The amplified AC signal component is then led to the phase detector 17. The phase detector 17 measures a phase difference between the fundamental-wave component and the SHG-wave component from the AC signal components.

The phase detector 17 is formed of a lock-in amplifier, and the SHG-wave component output from the differential amplifier 16 is input to a signal input terminal of the lock-in amplifier, while the fundamental-wave component output from the differential amplifier 15 is input to a reference signal input terminal of the lock-in amplifier. The lock-in amplifier is operated in a 2F mode. This circuit arrangement enables direct measurement of a phase difference between the fundamental-wave component and the harmonic component, because the frequency of the AC signal obtained from the output of the detectors 13 and 14 for the SHG-wave component is twice the frequency of the fundamental-wave component.

Next, a description will be given of a method for measuring the phase characteristics of the sample.

(1) The harmonic generator 2 is caused to generate a harmonic.

(2) The split ratio of the beam splitter 3 is adjusted in order to set the amount of the local oscillator light to a necessary and sufficient level.

(3) Light that is transmitted through, reflected from, or emitted from the sample 5 placed on the signal light path is caused to undergo path difference modulation performed by means of the path difference modulation mirror 7 and is caused to reach the optical mixer 8 to be mixed with the local oscillator light.

(4) The optical separators 9 and 10 are caused to separate each of the interference signals output from the optical mixer 8 into the fundamental-wave component and the harmonic component, which are then subjected to optical homodyne detection.

(5) The two AC signals generated due to path difference modulation and obtained by means of optical detection are input to the phase detector in order to obtain the difference between the fundamental-wave component and the harmonic component.

Figure 2:
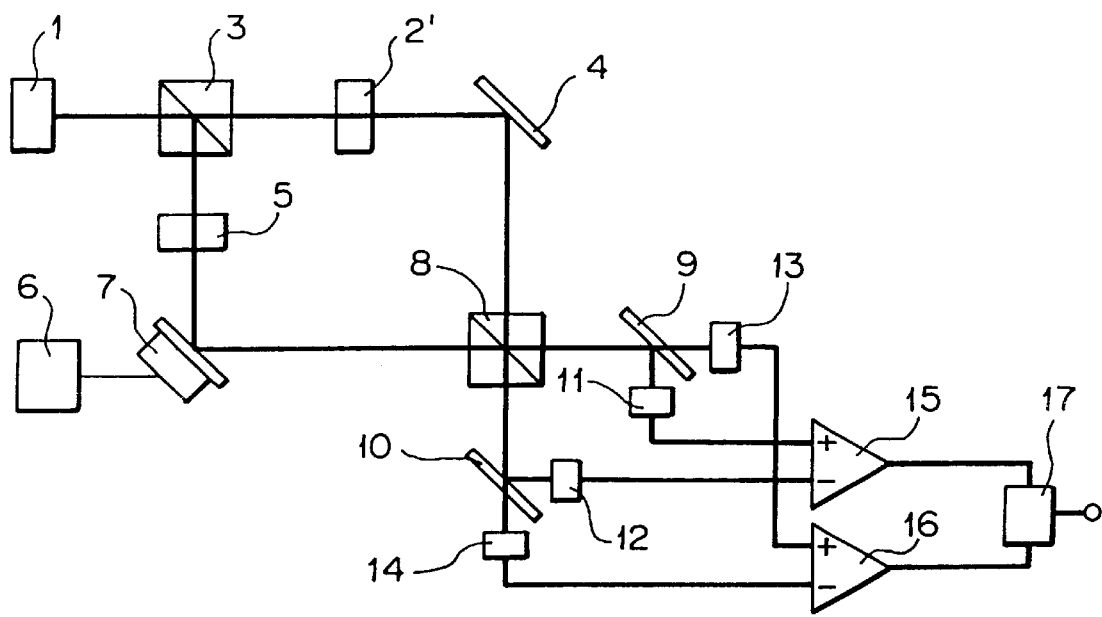
FIG. 2 is a diagram showing the overall structure of an optical phase characteristic measuring apparatus according to a second embodiment of the present invention.

Second Embodiment:

FIG. 2 is a diagram showing the overall structure of an optical phase characteristic measuring apparatus according to a second embodiment of the present invention. The portions identical to those of the first embodiment are denoted by common reference numerals, and descriptions therefor will be omitted.

The optical phase characteristic measuring apparatus according to the second embodiment is characterized in that the phase characteristics of the sample 5 are measured while a harmonic component generated from the sample 5 is utilized. In the present embodiment, a harmonic generator 2' is interposed between the beam splitter 3 and the mirror 4 such that the harmonic generator 2' is used only for the local oscillator light.

Figure 3:
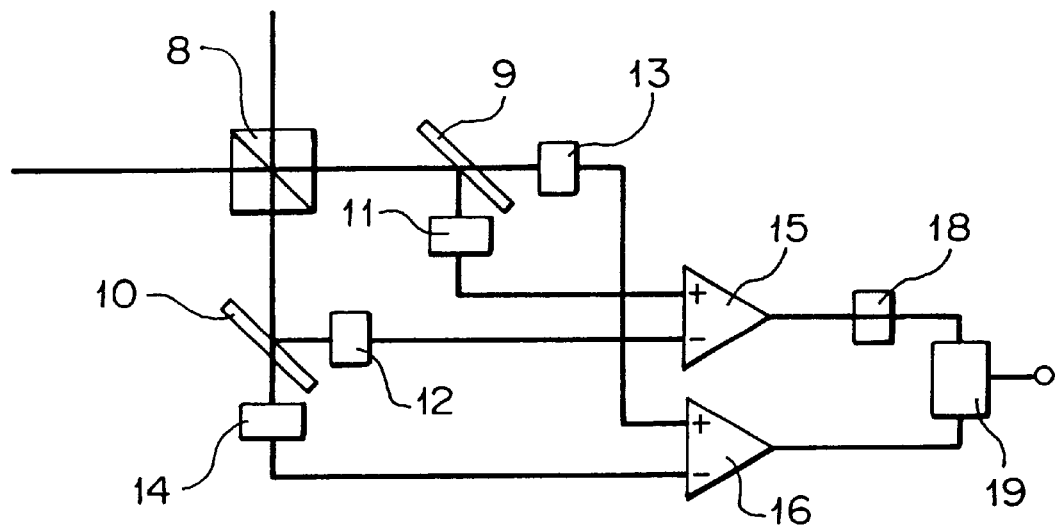
FIG. 3 is a diagram showing the structure of a main portion of an optical phase characteristic measuring apparatus according to a third embodiment of the present invention.

Third Embodiment:

FIG. 3 is a diagram showing the structure of a main portion of an optical phase characteristic measuring apparatus according to a third embodiment of the present invention. Although the present embodiment is a modification of the first embodiment of the present invention, the present embodiment may also be practiced in the second embodiment.

As shown in FIG. 3, a frequency multiplier 18 and a phase detector 19 are provided in place of the phase detector 17. The frequency multiplier 18 serves as a means for multiplying the frequency of an AC signal derived from the fundamental-wave component by N, while the phase detector 19 serves as a means for detecting a phase difference. In the optical phase characteristic measuring apparatus having the above-described structure, since two signals input to the phase detector 19 have the same frequency, an ordinary phase detector can be used as the phase detector 19.

Figure 4:
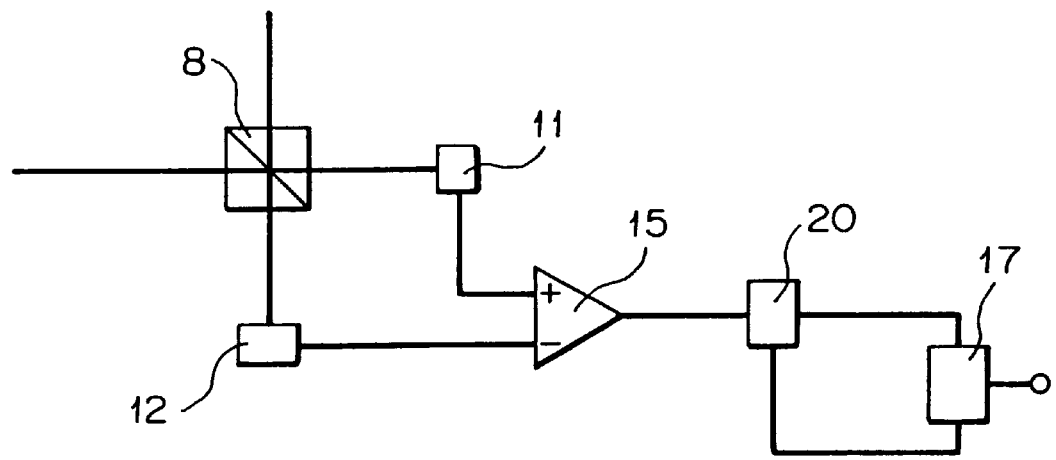
FIG. 4 is a diagram showing the structure of a main portion of an optical phase characteristic measuring apparatus according to a fourth embodiment of the present invention.

Fourth Embodiment:

FIG. 4 is a diagram showing the structure of a main portion of an optical phase characteristic measuring apparatus according to a fourth embodiment of the present invention. Although the present embodiment is a modification of the first embodiment of the present invention, the present embodiment may also be practiced in the second embodiment.

As shown in FIG. 4, there is provided a separator 20 for separating from each other the fundamental-wave component and the harmonic component of the output signal of the detection means. In the present embodiment, the optical separators 9 and 10 used in the first and second embodiments are not used, and each of the interference signals is detected by use of a single optical detector. That is, the fundamental-wave component and the harmonic component of each interference signal are concurrently detected by means of the optical detector 11 or 12 and then input to the differential amplifier 15. The fundamental-wave component and the SHG-wave component of the output from the differential amplifier 15 are separated from each other by means of the separator 20 and then input to the phase detector 17. Thus, the phase difference between the fundamental-wave component and the SHG-wave component is determined.

Figure 5:
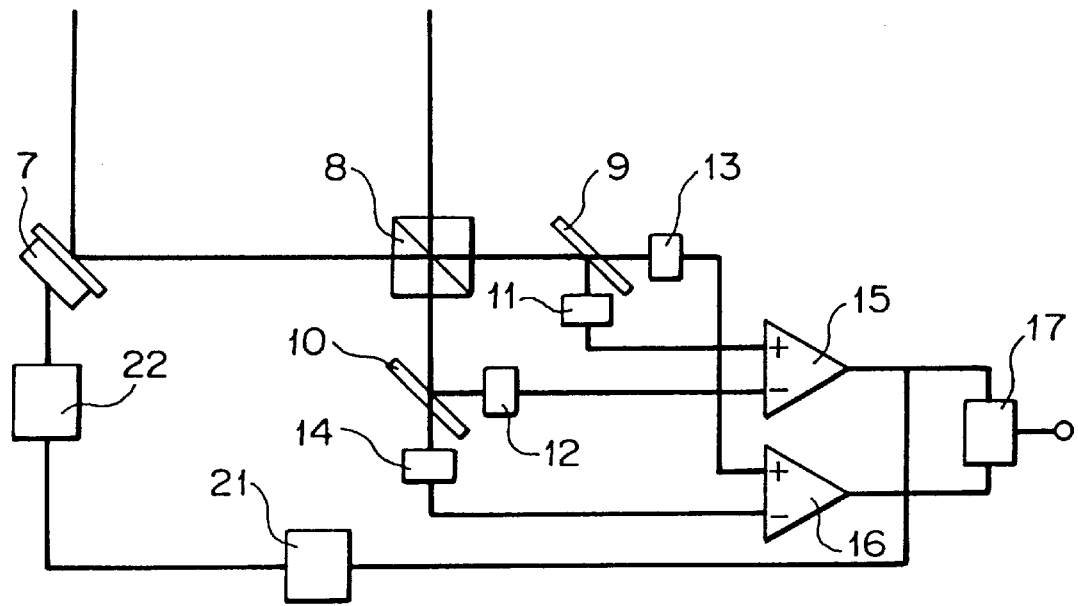
FIG. 5 is a diagram showing the structure of a main portion of an optical phase characteristic measuring apparatus according to a fifth embodiment of the present invention.

Fifth Embodiment:

FIG. 5 is a diagram showing the structure of a main portion of an optical phase characteristic measuring apparatus according to a fifth embodiment of the present invention. Although the present embodiment is a modification of the first embodiment of the present invention, the present embodiment may also be practiced in the second embodiment.

In the first through fourth embodiments, since the signal generator 6 for path difference modulation generates a triangular wave, the direction of modulation of the optical path difference is reversed at each peak of the triangular wave, so that the phase of the generated AC signal changes discontinuously, which makes phase measurement unstable.

In order to solve the above-described problem, the present embodiment shown in FIG. 5 further comprises a resonator 21 and a waveform conversion circuit 22. The resonator 21 separates the fundamental-wave component from the AC signal output from the differential amplifier 15. The waveform conversion circuit 22 converts the waveform of the separated fundamental-wave component into a triangular waveform and outputs the same to the piezoelectric element for moving the mirror 7 for path difference modulation.

In the above-described configuration, the mirror 7 for path difference modulation is brought into a self-oscillation state. In such a self-oscillation state, the mirror 7 for path difference modulation moves only to such an extent that the phase of the fundamental wave changes by 180 degrees. Therefore, the phase of a generated AC signal changes continuously, so that stable phase measurement is enabled. Further, since the output of the resonator 21 has a sinusoidal waveform, the waveform conversion circuit 22 is used to covert the waveform of the output of the resonator 21 into a triangular waveform.

Figure 6:
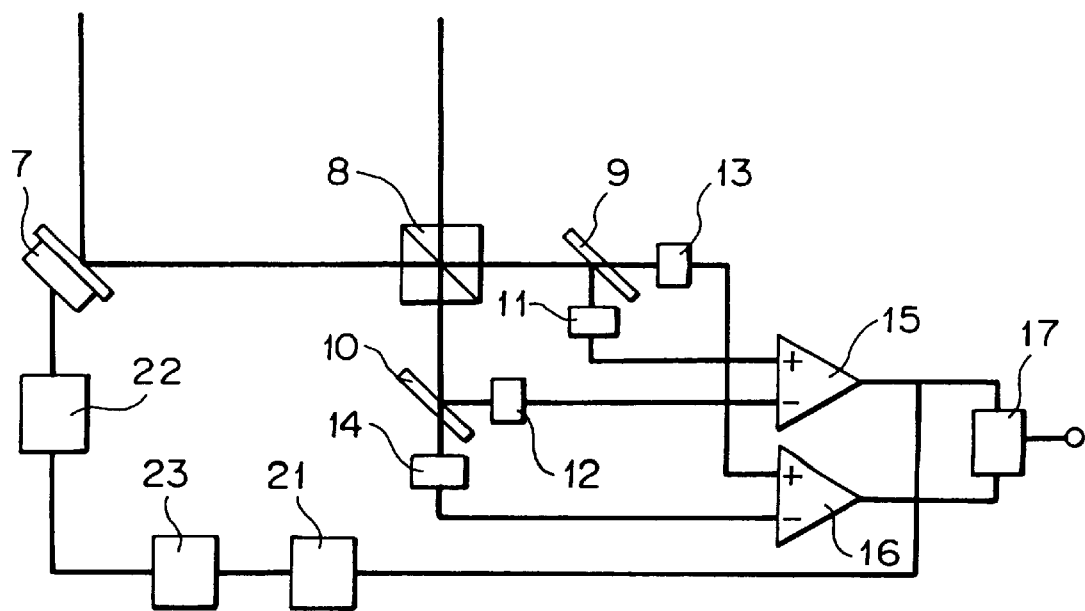
FIG. 6 is a diagram showing the structure of a main portion of an optical phase characteristic measuring apparatus according to a sixth embodiment of the present invention.

Sixth Embodiment:

FIG. 6 is a diagram showing the structure of a main portion of an optical phase characteristic measuring apparatus according to a sixth embodiment of the present invention. Although the present embodiment is a modification of the first embodiment of the present invention, the present embodiment may also be practiced in the second embodiment.

In the fifth embodiment, when no AC component is derived from the fundamental wave, the mirror 7 for path difference modulation is not brought into a self-oscillation state. In order to solve this problem, the present embodiment further comprises an injection-locked oscillator 23. The injection-locked oscillator 23 oscillates in a self-oscillation state when the amplitude of the AC signal derived from the fundamental wave is insufficient, and oscillates synchronously with the frequency of the AC signal when the amplitude of the AC signal derived from the fundamental wave increases to a sufficient level. Thus, a signal for path difference modulation can be generated stably.

Next, a description will be given of results of an experiment that was performed through use of the optical phase characteristic measuring apparatus according to the second embodiment of the present invention.

Figure 7:
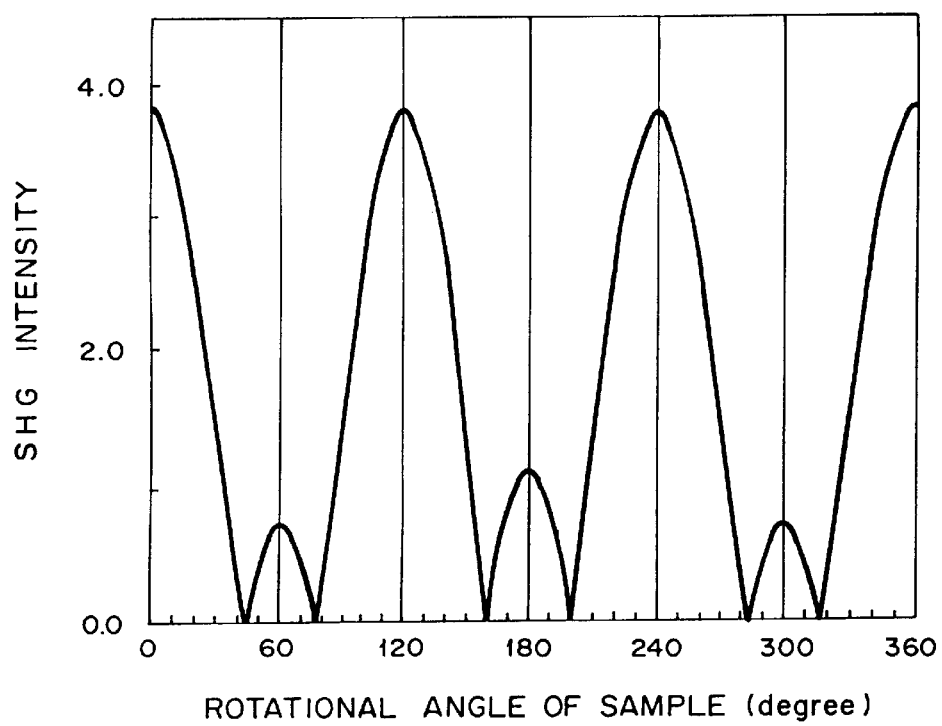
FIG. 7 is a graph showing results of an experiment performed through use of the optical phase characteristic measuring apparatus according to the second embodiment of the present invention.
Figure 8:
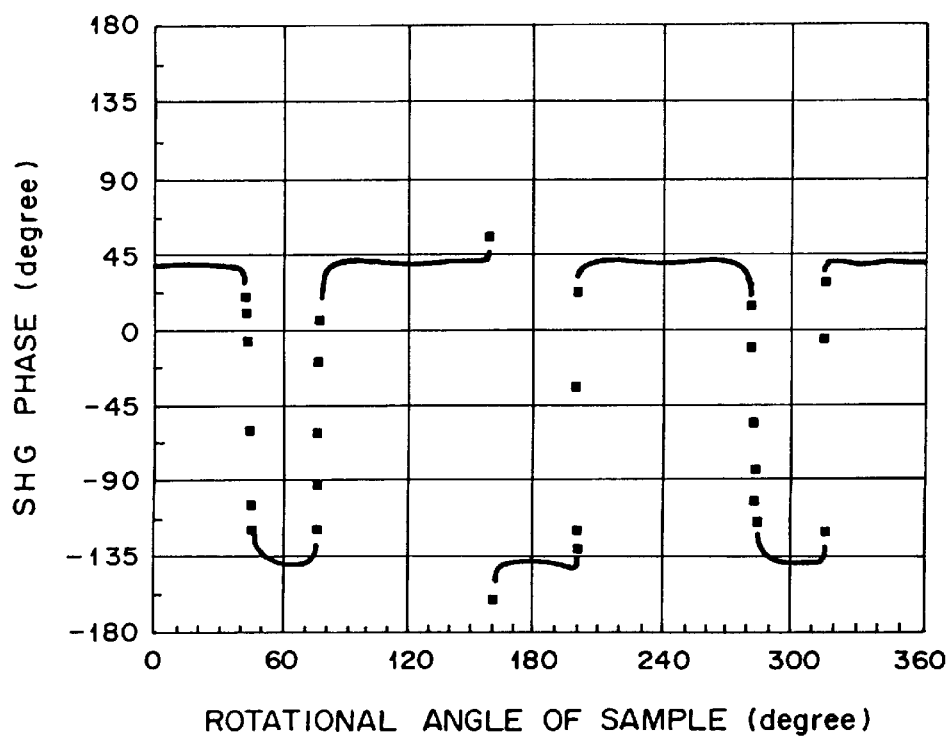
FIG. 8 is a graph showing variation in phase with variation in rotational angle of a sample, which was measured through use of the optical phase characteristic measuring apparatus according to the second embodiment of the present invention.

In the experiment, a pulse laser was used as a light source, and the amplitude and phase of a second harmonic (SHG wave) generated at the surface of a sample silicon substrate were measured. FIGS. 7 and 8 shows the results of the mesurement. That is, FIG. 7 shows a variation in the strength of the SHG wave when the sample was rotated. In FIG. 7, the horizontal axis indicates the rotational angle of the sample, while the vertical axis indicates the strength of the SHG wave. From the result shown in FIG. 7, it is understood that a large peak of the SHG wave was measured each time the sample rotates 120 degrees and a small peak was measured between the large peaks.

FIG. 8 shows a variation in the phase angle of the SHG wave when the sample was rotated. In FIG. 8, the horizontal axis indicates the rotational angle of the sample, while the vertical axis indicates the phase angle of the SHG wave.

The result shown in FIG. 8 demonstrates that a phase difference of 180 degrees is present between the phase at which the SHG wave has a large amplitude or reaches the large peak and the phase at which the SHG wave has a small amplitude or reaches the small peak.

As described above, in the present embodiment, the phase of an SHG wave generated from a sample can be measured with reference to the phase of the fundamental-wave component. In addition, since the homodyne detection method described in Japanese Patent Application No. 8-185235 is used, detection of a very small amplitude can be performed concurrently.

In the above-described experiment, since the ultrafast optical pulses were used, the difference in arrival time between the fundamental wave and the SHG wave—which is caused by differences among refractive index dispersion of the components used in the two optical paths from the output of the beam splitter to the input of the optical mixer—is compensated through insertion of a medium having a predetermined refractive index dispersion into one of the optical paths.

Further, in the second embodiment, when the polarizing direction of signal light is changed through use of a half wavelength ($\lambda/2$) plate or the like, the stable generation of the fundamental wave is enabled through insertion of a wavelength plate on the output side of the harmonic generator 2' for the local oscillator light, wherein the wavelength plates serve as a zero or full wavelength for the SHG wave and serve as a quarter wavelength ($\lambda/4$) plate for the fundamental wave in order to circularly polarize the fundamental wave.

Further, a similar effect was obtained when a half Wavelength ($\lambda/2$) plate of the fundamental wave was interposed into the path for local oscillation light and was rotated synchronously with the half wavelength plate interposed in the path for signal light.

Although the first and second embodiments employ a Mach-Zehnder interferometer, similar operation is possible even when there is used another type of interferometer such as a Michelson interferometer. Further, components utilizing optical fibers may be used.

The first through sixth embodiments of the present invention have the following advantageous effects.

(1) Stabilization of an interferometer is not required even when there is used a harmonic having a phase correlation with the fundamental wave of the light source, and an AC signal component generated through modulation of the optical path difference is measured. Further, the measuring apparatus is very stable.

(2) Since homodyne detection is used, the measuring apparatus has a very high sensitivity, and the amplitude characteristics can be measured concurrently.

(3) Since the optical detectors are not required to have broad-band characteristics, the structure of the measuring apparatus can be simplified.

In the following embodiments, a description will be given of apparatuses and methods for measuring the amplitude and the phase of an optical signal.

Figure 9:
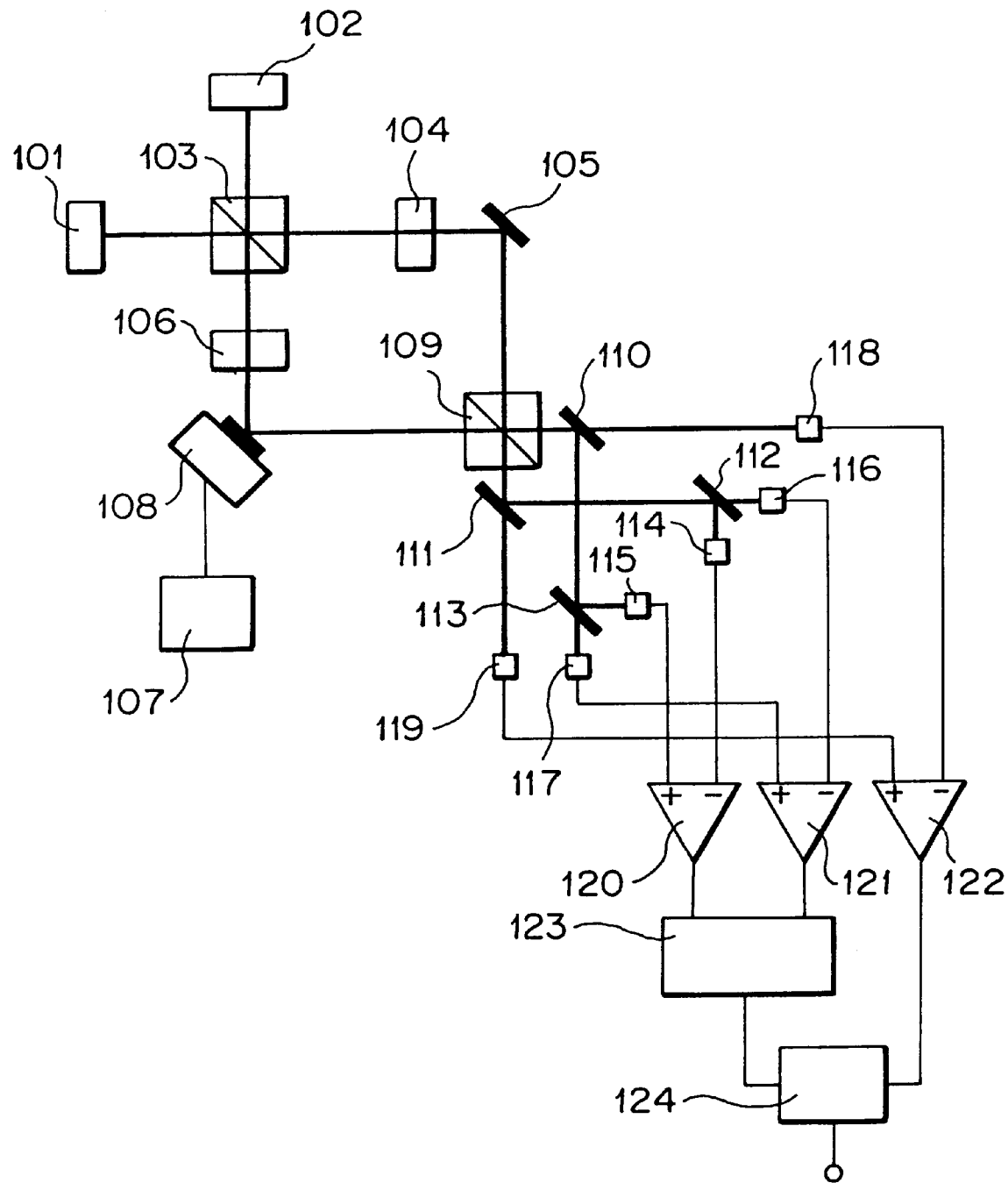
FIG. 9 is a diagram showing the structure of an optical amplitude/phase characteristic measuring apparatus according to a seventh embodiment of the present invention.

Seventh Embodiment:

FIG. 9 is a diagram showing the structure of an optical amplitude/phase characteristic measuring apparatus according to a seventh embodiment of the present invention.

As shown in FIG. 9, the optical amplitude/phase characteristic measuring apparatus according to the seventh embodiment comprises a first light source 101, a second light source 102, a beam splitter 103, a sum-frequency generation element 104, a mirror 105, a sample 106 to be measured, a signal generator 107 for generating a signal for path difference modulation, a mirror 108 for path difference modulation, an optical mixer 109, a first optical separator 110, a second optical separator 111, a third optical separator 112, a fourth optical separator 113, a first optical detector 114, a second optical detector 115, a third optical detector 116, a fourth optical detector 117, a fifth optical detector 118, a sixth optical detector 119, a first differential amplifier 120, a second differential amplifier 121, a third differential amplifier 122, a modulator 123, and a lock-in detector 124.

The beam splitter 103 simultaneously sprits two fundamental-wave components, the optical mixer 109 simultaneously mixes the fundamental-wave components and the sum-frequency component. A half mirror, a non-polarizing beam splitter, a polarizing beam splitter, an optical directional coupler, etc. may be used as the beam splitter 103 and the optical mixer 109.

The sum-frequency generation element 104 serves as a means for generating a sum-frequency component from the fundamental waves from the two light sources; the signal generator 107 and the mirror 108 serve as a means for modulating a path difference; the optical separators 110, 111, 112, and 113 serve as a means for separating the sum-frequency component and the fundamental-wave components from each other; the optical detectors 114, 115, 116, and 117 and the differential amplifiers 120 and 121 serve as a means for detecting the fundamental-wave components; the optical detectors 118 and 119 and the differential amplifier 122 serve as a means for detecting the sum-frequency component; the modulator 123 serves as a means for generating a sum-frequency component from two AC signals from the amplifiers 120 and 121; and the lock-in detector 124 serve as a means for detecting an amplitude and a phase difference.

The sum-frequency generation element 104 is formed of a nonlinear optical crystal in order to efficiently generate a sum-frequency component for the local oscillator light side.

The mirror 108 for path difference modulation is only required to produce a vibration having an amplitude about a few times the light wavelength, and may be an optical mirror boned to a piezoelectric element. Since the function of the piezoelectric element is to continuously change the phase of light, any mechanism may be used insofar as the mechanism can cause a phase variation to the same extent as in the case where a piezoelectric element is used.

The optical separators 110, 111, 112, and 113 separate from one another the sum-frequency component and the fundamental-wave components. A spectral prism, a dichroic mirror, or the like may be used as the optical separators 110, 111, 112, and 113. The optical separators 110 and 113 may be integrated to form a separator for simultaneous separation of the sum-frequency component and the fundamental-wave components.

The output from each of the optical separators 112 and 113 may be detected through use of a single optical detector. However, in the present embodiment, there is employed a balanced detection in which the two optical detectors 114 and 115 are combined with the differential amplifier 120; the two optical detectors 116 and 117 are combined with the differential amplifier 121; and the two optical detectors 118 and 119 are combined with the differential amplifier 122. It is apparent that employment of balanced detection suppresses amplitude noise contained in the light output from the light sources, so that the level of noise within the measurement system is decreased to the level of shot noise, resulting in an improved SN ratio and increased sensitivity.

A lock-in amplifier or the like may be used as the lock-in detector 124.

Next, a description will be given of operation of the optical amplitude/phase characteristic measuring apparatus according to the seventh embodiment of the present invention.

Instability of a homodyne interferometer is mainly caused by phase change due to variation in optical path difference of the interferometer. In general, such phase change is detected in order to stabilize the interferometer by means of negative feedback control. In such a case, it is difficult to separate from each other a negative feedback signal and a phase signal to be measured.

When one of the optical path lengths is modulated in a state in which the interferometer is not stabilized, interference fringes change in accordance with the modulation speed and the amplitude, so that an AC signal is generated. The amplitude of this AC signal coincides with the visibility of the interferometer and therefore is very stable (see Japanese Patent Application Laid-Open No. 10-30965).

However, since the instability caused by the un-stabilized interferometer is converted into the phase of the AC signal, amplitude and phase characteristics cannot be measured stably.

In order to solve the problem, the two fundamental-wave components from the two light sources and the sum-frequency component are utilized in order to measure the phase characteristics with considerably high stability.

When it is assumed that the lights from the two light sources respectively have frequencies $f_{01}$ and $f_{02}$, the sum frequency $f_{os}$ is expressed by $f_{os}=f_{01}+f_{02}$. When the optical path difference of the interferometer is modulated through use of a modulation signal having a triangular waveform, a detection output contains an AC signal corresponding to the speed of modulation of the optical path difference. When it is assumed that AC signals contained in detection outputs derived from the two fundamental-wave components and the sum-frequency component respectively have frequencies $f_{r1}$, $f_{r2}$, and $f_{rs}$, these frequencies are respectively represented by $f_{r1}=f_{01}/k$, $f_{r2}=f_{02}/k$, and $f_{rs}=f_{os}/k$, where k is a constant in relation to the speed of modulation of the optical path difference. Accordingly, the frequency $f_{rs}$ of the detection output derived from the sum-frequency component is the sum of $f_{r1}$ and $f_{r2}$.

The AC signal of the sum-frequency component (frequency: $f_{rr}=f_{r1}+f_{r2}$) composed from the AC signals having frequencies of $f_{r1}$ and $f_{r2}$ retains the information regarding the phases of the light signals having frequencies of $f_{01}$ and $f_{02}$.

Accordingly, when the AC signal component of the frequency $f_{rs}$ obtained through detection of light having the sum frequency is subjected to lock-in detection, while the AC signal component having the sum frequency $f_{rr}$ is used as a reference signal, the amplitude and phase of the light having the sum frequency cab be measured with high sensitivity.

The interferometer is of a homodyne detection scheme. Therefore, if a sufficient amount of light is used as local oscillator light transmitting through one of the optical paths, the intensity of signal light transmitting through the other optical path can be made very low, so that measurement of amplitude characteristics can be performed concurrently with highly sensitive measurement of phase characteristics. Further, since the optical detectors used in the present embodiment is only required to have a bandwidth necessary to detect an AC signal generated upon modulation of the optical path difference, the optical detectors do not have to have a wide band characteristics.

In FIG. 9, the beam splitter 103 splits into two beams light output from the first light source 101 and the second light source 102. One light beam is led to the sum-frequency generation element 104, where a sum-frequency component is generated. The two fundamental-wave components and the sum-frequency component are used as local oscillator light for homodyne detection. The fundamental-wave components and the sum-frequency component output from the sum-frequency generation element 104 are reflected by means of the mirror 105 and led to the optical mixer 109.

The other beam from the beam splitter 103 impinges on the sample 106 as signal light. The light generated at the sample 106 and containing fundamental components and a sum-frequency component is reflected at the mirror 108 for path difference modulation, which is operated by means of the signal generator 107 for path difference modulation, and is then led to the optical mixer 109.

Two interference signals output from the optical mixer 109 and containing the three components are led to the first optical separator 110 and the second optical separator 111, where each signal is separated into the fundamental-wave components and the sum-frequency component.

The fundamental-wave components separated by means of the first and second optical separators 110 and 111 are further separated into two fundamental-wave components by means of the third and fourth optical separators 112 and 113. The thus-separated fundamental-wave components are detected by the first and second optical detectors 114 and 115 and the first differential amplifier 120, and by the third and fourth optical detectors 116 and 117 and the second differential amplifier 121. An AC signal component generated due to path difference modulation output from each of the differential amplifiers 120 and 121 are then led to the modulator 123. The modulator 123 generates a signal whose frequency is the sum of the frequencies of the two AC signals derived from the fundamental waves. The thus generated signal is fed to a reference signal input terminal of the lock-in detector 124.

Meanwhile, the sum-frequency component separated by means of the first and second optical separators 110 and 111 are detected and amplified by means of the fifth and sixth optical detectors 118 and 119 and the differential amplifier 122 and is then led to a signal input terminal of the lock-in detector 124.

Since the frequency of the reference signal of the lock-in detector 124 generated at the modulator 123 and the frequency of a signal light component obtained through detection of the sum-frequency component are always equal to each other even when the interferometer fluctuates, the lockin detector 124 can measure the signal light component with high sensitive.

Next, a description will be given of a method for measuring the amplitude and phase difference of the sum-frequency component generated at a sample to be measured.

(1) The beam splitter 103 is caused to simultaneously split output light from the light source 101 and output light from the light source 102.

(2) The split ratio of the beam splitter 103 is adjusted in order to set the amount of the local oscillator light to a necessary and sufficient level.

(3) The nonlinear optical crystal 104 serving as the sum-frequency generation element 104 is caused to generate light having a frequency equal to the sum of the frequency of the light from the light source 101 and the frequency of the light from the light source 102, and lead the light, together with two fundamental waves, to the optical mixer 109.

(4) Light that is transmitted through, reflected from, or emitted from the sample 106 placed on the signal light path and that contains the two fundamental-wave components is caused to be modulated by means of the path difference modulation mirror 108, which is operated in accordance with a triangular wave from the signal generator 107 for path difference modulation and is caused to reach the optical mixer 109 to be mixed with the local oscillator light.

(5) The first and second optical separators 110 and 111 are caused to separate each of the interference signals output from the optical mixer 109 into the sum-frequency component and the fundamental-wave components, which are further separated from each other by the third and fourth optical separators 112 and 113.

(6) The components separated by means of the first through fourth optical separators 110 - 113 are detected and amplified in order to output three AC signal components.

(7) The modulator 123 is caused to generate a sum component from the two AC signals derived from the fundamental waves and feed the sum component to the reference signal input terminal of the lock-in detector 124.

(8) The AC signal derived from the sum-frequency component is supplied to the signal input terminal of the lock-in detector 124 in order to detect the amputated of the sum-frequency component and the phase difference between the sum-frequency component and the reference signal.

Figure 10:
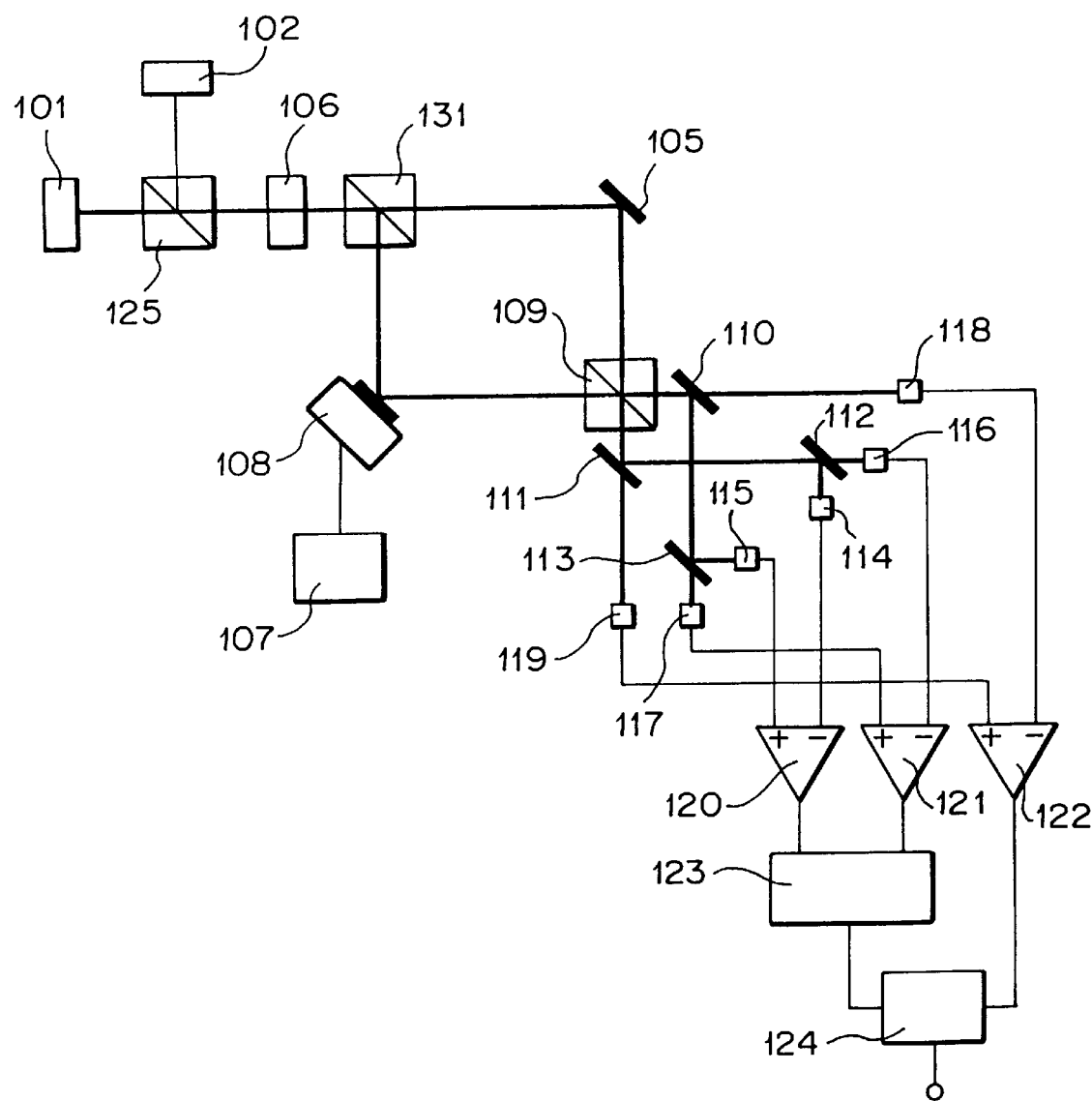
FIG. 10 is a diagram showing the structure of an optical amplitude/phase characteristic measuring apparatus according to an eighth embodiment of the present invention.

Eighth Embodiment:

FIG. 10 is a diagram showing the structure of an optical amplitude/phase characteristic measuring apparatus according to an eighth embodiment of the present invention. The portions identical to those of the seventh embodiment are denoted by the common reference numerals, and descriptions therefor will be omitted.

As shown in FIG. 10, the present embodiment is identical to the seventh embodiment, except that the optical amplitude/phase characteristic measuring apparatus of the present embodiment further comprises an optical mixer 125 and a beam splitter 131.

The optical mixer 125 mixes the fundamental-wave components from the first and second light sources 101 and 102. The beam splitter 131 simultaneously split the two fundamental-wave components and the sum-frequency component. A half mirror, a non-polarizing beam splitter, a polarizing beam splitter, an optical directional coupler, etc. may be used as the optical mixer 125 and the beam splitter 131.

Next, a description will be given of operation of the optical amplitude/phase characteristic measuring apparatus according to the eighth embodiment of the present invention.

In FIG. 10, the output light from the first light source 101 and the output light from the second light source 102 are mixed by means of the optical mixer 125, the output of which is radiated onto the sample 106 in order to generate a sum-frequency component. The light beam containing the two fundamental-wave components and the sum-frequency component is separated into two beams by means of the beam splitter 131. The separated light beams serve as signal light and local oscillation light for homodyne detection. In a manner similar to that for the seventh embodiment, the fundamental-wave components and the sum-frequency component are then subjected to optical detection in order to measure the amplitude and phase of the sum-frequency component.

In the seventh and eighth embodiments, the sum-frequency generation element is used. However, instead of the sum-frequency generation element, a difference-frequency generation element may be used. In this case, the modulator is modified such that an output is produced based on a difference between the frequencies of the AC signal components of the two fundamental waves. Thus, the amplitude and phase difference of the difference-frequency component generated at the sample can be measured.

That is, when it is assumed that the difference of the frequencies of the light signals is $f_{od}$, and the frequency of a signal obtained through detection of the difference-frequency component is $f_{rd}$, the frequency $f_{rd}$ is expressed by $f_{rd}=(f_{o1}-f_{o2})/k=f_{r1}-f_{r2}$. Therefore, as in the above-described case where a sum frequency is used, a detection signal of the difference-frequency component of light can be detected through lock-in detection while there is used, as a reference signal, the difference frequency component that is generated by the modulator and has a frequency corresponding to the difference between the frequencies of the two fundamental-wave components.

Although the seventh and eighth embodiments employ a Mach-Zehnder interferometer, similar operation is possible even when other types of interferometers such as a Michelson interferometer are used. Further, components utilizing optical fibers may be used.

The seventh and eighth embodiments of the present invention have the following advantageous effects.

(A) Light containing two fundamental-wave components from the light sources and a sum- or difference-frequency component that has a phase correlation with the fundamental-wave components is subjected to optical path modulation in order to generates AC signal components, which are then measured. Therefore, stabilization of an interferometer is not required, and the measuring apparatus is very stable.

(B) Since homodyne detection and phase sensitive lock-in detector are used, the measuring apparatus has a very high sensitivity, and the amplitude and phase characteristics can be measured concurrently.

(C) Since the optical detectors are not required to have a broad-band characteristics, the structure of the measuring apparatus can be simplified.

The present invention is not limited to the above-mentioned embodiment. Numerous modifications and variations of the present invention are possible in light of the spirit of the present invention, and they are not excluded from the scope of the present invention.

What is claimed is:

1. An optical phase characteristic measuring apparatus comprising:
    (a) means for generating a harmonic from a fundamental wave of output light from a light source;
    (b) a beam splitter for splitting the output light into a first pair of first fundamental-wave component and a first harmonic component, and a second pair of a second fundamental-wave component and a second harmonic component;
    (c) a sample disposed in one of optical paths along which light beams from the beam splitter propagate;
    (d) means for modulating the length of one of the optical paths;
    (e) an optical mixer for mixing the light beams containing the first fundamental-wave component and the first harmonic component and the second fundamental-wave component and the second harmonic component;
    (f) an optical separator for separating light output from the optical mixer into a third fundaumental-wave component and a third harmonic component;
    (g) a first optical detector for detecting the third fundamental-wave component of an output from the optical separator;
    (h) a second optical detector for detecting the third harmonic component of the output from the optical separator; and
    (i) means for detecting a phase difference between AC signals output from the two optical detectors.

2. An optical phase characteristic measuring method wherein there are provided means for generating a harmonic from a fundamental wave of output light from a light source and a beam splitter for splitting the output light into a first pair of a first fundamental wave component and a first harmonic component, and a second pair of a second fundamental-wave component and a second harmonic component; a sample is disposed in one of optical paths along which light beams from the beam splitter propagate; and there are further provided means for modulating the length of one of the optical paths, an optical mixer for mixing the light beams containing the first fundamental-wave component and the first harmonic component, and the second fundamental-wave component and the second harmonic component, an optical separator for separating light output from the optical mixer into a third fundamental-wave component and a third harmonic component, a first optical detector for detecting the third fundamental-wave component of an output from the optical separator, a second optical detector for detecting the third harmonic component of the output from the optical separator, and means for detecting a phase difference between AC signals output from the two optical detectors, wherein a harmonic component is generated from the fundamental-wave component of output light from the light source; after splitting by the beam splitter, the length of one of the optical paths is modulated; the fundamental-wave component and the harmonic component are separately subjected to homodyne detection; and a phase difference between AC signals generated by the modulation of optical path difference is measured.

3. An optical phase characteristic measuring apparatus comprising:
    (a) a beam splitter for splitting output light from a light source into a first fundamental-wave component and a second fundamental-wave component;
    (b) a sample disposed in one of optical paths along which light beams from the beam splitter propagate;
    (c) means disposed in the other optical path and adapted to generate a first harmonic;
    (d) means for modulating the length of one of the optical paths;
    (e) an optical mixer for mixing the light beams containing the first and second fundamental-wave component and the first harmonic component and a second harmonic component generated from the sample;
    (f) an optical separator for separating light output from the optical mixer into a third fundamental-wave component and a third harmonic component;
    (g) a first optical detector for detecting the third fundamental-wave component of an output from the optical separator;
    (h) a second optical detector for detecting the third harmonic component of the output from the optical separator; and
    (i) means for detecting a phase difference between AC signals output from the two optical detectors.

4. An optical phase characteristic measuring method wherein there is provided a beam splitter for splitting output light from a light source into a first fundamental-wave component and a second fundamental wave component; a sample is disposed in one of optical paths along which light beams from the beam splitter propagate; and there are further provided means disposed in the other optical path and adapted to generate a first harmonic, means for modulating the length of one of the optical paths, an optical mixer for mixing the light beams containing the first and second fundamental-wave component and the first harmonic component and a second harmonic component generated from the sample, an optical separator for separating light output from the optical mixer into a third fundamental-wave component and a third harmonic component, a first optical detector for detecting the third fundamental-wave component of an output from the optical separator, a second optical detector for detecting the third harmonic component of the output from the optical separator, and means for detecting a phase difference between AC signals output from the two optical detectors, wherein after the fundamental-wave component of the output light from the light source is split, the harmonic component is generated by the sample disposed in one of the optical paths; the length of one of the optical paths is modulated; the fundamental-wave component and the harmonic component are separately subject to homodyne detection, thereby measuring a phase difference between AC signal components generated by the modulation of the optical path difference.

5. An optical phase characteristic measuring apparatus according to claim 1 or 3, further comprising:

means for multiplying by N the frequency of the AC signal output from the first optical detector for detecting the third fundamental-wave component (where N is the order of a harmonic generated by the harmonic generation means); and means for measuring a phase difference between an output of the second optical detector for detecting the third harmonic component and a signal having a frequency that is N times the frequency of the AC signal.

6. An optical phase characteristic measuring method according to claim 2 or 4, wherein the frequency of the AC signal output from the first optical detector for detecting the third fundamental-wave component is multiplied by N (where N is the order of a harmonic generated by the harmonic generation means); and a phase difference between an output of the second optical detector for detecting the third harmonic component and a signal having a frequency that is N times the frequency of the AC signal is measured.

7. An optical phase characteristic measuring apparatus according to any one of claims 1, 3, and 5, further comprising:

a third optical detector for detecting the third fundamental-wave component and the third harmonic component of the output of the optical mixer;

a electrical separator for separating a signal output from the third optical detector; and means for measuring a phase difference between output signals of the separator.

8. An optical phase characteristic measuring method according to any one of claims 2, 4, and 6, wherein the third fundamental-wave component and the third harmonic component of the output of the optical mixer is detected by use of a third optical detector; a signal output from the third optical detector is separated through use of a electrical separator; and a phase difference between output signals of the separator is measured.

9. An optical phase characteristic measuring apparatus according to any one of claims 1, 3, 5, and 7, further comprising:

a resonator for passing an AC component of the output signal of the detector; and means for converting the waveform of an AC component output from the resonator into a triangular waveform.

10. An optical phase characteristic measuring method according to any one of claims 2, 4, 6, and 8, wherein there are disposed a resonator for passing an AC component of the output signal of the detector; and means for converting the waveform of an AC component output from the resonator into a triangular waveform, and wherein an AC signal generated through modulation of the optical path difference is fed back to the means for modulating the optical path difference to bring it into a self oscillation state to thereby generate an AC signal.

11. An optical phase characteristic measuring apparatus according to claim 9, further comprising:

a resonator for passing an AC component of the output signal of the detector; and means for causing oscillation at a frequency substantially equal to the frequency of the AC component output from the resonator.

12. An optical phase characteristic measuring method according to claim 10, wherein there are provided a resonator for passing an AC component of the output signal of the detector; and means for causing oscillation at a frequency substantially equal to the frequency of the AC component output from the resonator, and wherein an AC signal generated by the modulation of the optical path difference is injected into the oscillation means that oscillates in a self-oscillation state, in order to establish synchronization, thereby generating the AC signal.

* * * * *